US011230956B2

(12) United States Patent
Yashiro et al.

(10) Patent No.: US 11,230,956 B2
(45) Date of Patent: *Jan. 25, 2022

(54) EXHAUST SYSTEM FOR ENGINE

(71) Applicant: Mazda Motor Corporation, Hiroshima (JP)

(72) Inventors: Koichi Yashiro, Aki-gun (JP); Tamotsu Takamure, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,827

(22) Filed: Sep. 24, 2020

(65) Prior Publication Data

US 2021/0131330 A1 May 6, 2021

(30) Foreign Application Priority Data

Oct. 31, 2019 (JP) .............................. JP2019-198403

(51) Int. Cl.
*F01N 3/20* (2006.01)
*F01N 11/00* (2006.01)
(Continued)

(52) U.S. Cl.
CPC ............ *F01N 3/2066* (2013.01); *F01N 11/00* (2013.01); *F01N 13/009* (2014.06); *F02B 37/00* (2013.01);
(Continued)

(58) Field of Classification Search
CPC ...... F01N 3/2066; F01N 13/009; F01N 11/00; F01N 2560/00; F01N 2340/04;
(Continued)

(56) References Cited

U.S. PATENT DOCUMENTS

2014/0060690 A1* 3/2014 Jang ........................ F01N 3/103
138/155
2018/0030875 A1* 2/2018 Kamo ....................... F01N 5/04

FOREIGN PATENT DOCUMENTS

| JP | 2018040368 A | 3/2018 | |
| WO | 2013104543 A2 | 7/2013 | |
| WO | WO-2015189011 A1 * | 12/2015 | ........... F01N 3/2066 |

OTHER PUBLICATIONS

Machine Traslation of WO-2015189011-A1 (Year: 2015).*

* cited by examiner

*Primary Examiner* — Brandon D Lee
(74) *Attorney, Agent, or Firm* — Alleman Hall Creasman & Tuttle LLP

(57) ABSTRACT

An exhaust system provided to an engine having an output shaft extending in a specific direction, includes an exhaust passage, a turbocharger having a turbine housing, and purifying parts. The exhaust passage includes a first passage part extending to one side in the specific direction from the turbine housing, a third passage part extending in the specific direction below the turbine housing, and a second passage part extending upward from one end part of the third passage part in the specific direction. A center axis of the second passage part inclines so that an upper end thereof is located on one side of a lower end in the specific direction. The first passage part has in an upper surface thereof an inclined part to which one of a sensor configured to detect a property of exhaust gas and an injector configured to inject fluid into exhaust gas, is attached.

13 Claims, 3 Drawing Sheets

(51) Int. Cl.
*F02B 37/00* (2006.01)
*F01N 13/00* (2010.01)
(52) U.S. Cl.
CPC ...... *F01N 2340/04* (2013.01); *F01N 2340/06* (2013.01); *F01N 2560/00* (2013.01); *F01N 2610/02* (2013.01); *F01N 2610/1453* (2013.01)
(58) Field of Classification Search
CPC ............. F01N 2340/06; F01N 2610/02; F01N 2610/1453; F01N 13/18; F02B 37/00
See application file for complete search history.

EXHAUST SYSTEM FOR ENGINE

TECHNICAL FIELD

The present disclosure relates to an exhaust system for an engine which includes an output shaft extending in a specific direction and a turbocharger driven by exhaust gas of the engine.

BACKGROUND OF THE DISCLOSURE

Some conventional engines have an exhaust passage which is provided with a turbocharger driven by exhaust gas to boost intake air and an emission control device for purifying the exhaust gas. Further, a plurality of emission control devices may be disposed in the exhaust passage.

For example, JP2018-040368A discloses an engine system in which a turbine housing of a turbocharger, a monolith catalyst, and a monolith filter are provided in an exhaust passage in this order from upstream to downstream. According to such an engine system, on the exhaust-side surface of the engine, the monolith catalyst is disposed forward of a turbine housing, and the monolith filter is disposed below the turbine housing. A connecting tube connecting the monolith catalyst and the monolith filter extends forward from the monolith catalyst, and the extended part is curved and then extends rearward to communicate with a front-end part of the monolith filter. Thus, in the engine system of JP2018-040368A, since the turbine housing, the monolith catalyst, and part of the connecting tube are arranged in the longitudinal direction, a longitudinal dimension of this area occupied by these components becomes large.

On the other hand, as disclosed in WO2013/104543A2, for example, by disposing an upstream emission control device so as to extend in a vertical direction, at a height between a turbine housing and a downstream emission control device, the longitudinal dimension of the area occupied by the turbine housing and the two emission control devices can be reduced.

However, even in a case where the upstream emission control device is disposed at the height between the turbine housing and the downstream emission control device as described above, the height of an upper end of a sensor attached upstream of the emission control device becomes high because the upstream emission control device is merely postured so as to extend vertically straight and an exhaust tube is provided so as to extend upward from an upper end part of the upstream emission device.

SUMMARY OF THE DISCLOSURE

The present disclosure is made in view of the above situations, and one purpose thereof is to provide an exhaust system for an engine that is capable of lowering a height of an upper end of a sensor, etc., while compactly disposing an exhaust passage around a turbine housing.

According to one aspect of the present disclosure, an exhaust system is provided to an engine having an output shaft extending in a specific direction. The exhaust system includes an exhaust passage through which exhaust gas discharged from the engine circulates, a turbocharger having a turbine housing, the turbine housing being formed therein with a passage through which exhaust gas passes and configured to accommodate a turbine wheel being driven by exhaust gas, and a first purifying part and a second purifying part configured to purify exhaust gas. The exhaust passage includes a first passage part connected to a downstream end of the turbine housing, a second passage part having the first purifying part therein and connected to a downstream end of the first passage part, and a third passage part having the second purifying part therein and connected to a downstream end of the second passage part. The first passage part extends to one side in the specific direction from the turbine housing. The third passage part extends in the specific direction below the turbine housing. The second passage part extends upward from one end part of the third passage part in the specific direction. A center axis of the second passage part inclines so that an upper end thereof is located on one side of a lower end thereof in the specific direction. The first passage part has in an upper surface thereof an inclined part inclining so that one side of the inclined part is located below the other side in the specific direction. One of a sensor configured to detect a property of exhaust gas and an injector configured to inject fluid into exhaust gas is attached to the inclined part.

According to this configuration, the third passage part having the second purifying part therein is disposed so that it extends in the specific direction below the turbine housing, and the second passage part having the first purifying part therein extends upward from one end part of the third passage part in the specific direction, and is connected to the first passage part extending to one side in the specific direction from the turbine housing. Therefore, a dimension of an area in the specific direction occupied by the turbine housing and the purifying parts can be reduced, and the exhaust passage including the purifying parts can be disposed compactly around the turbine housing.

Moreover, according to this configuration, in the upper surface of the first passage part, the inclined part is provided so that one side of the inclined part is located below the other side in the specific direction, and one of the sensor and the injector is attached to the inclined part. Therefore, a height of an upper end of one of the sensor and the injector can be lowered while providing the sensor or the injector at a location upstream of the first purifying part. In addition, the center axis of the second passage part inclines so that the upper end thereof is located on one side of the lower end thereof in the specific direction. Therefore, while providing the above described inclined part on the upper surface of the first passage part, a flow of exhaust gas along the inclined part can be led close to the center axis of the second passage part, and the exhaust gas can be introduced into the first purifying part more uniformly.

The inclined part may be provided with a flat-surface part, and one of the sensor and the injector may be attached to the flat-surface part.

According to this configuration, as compared with a case where the attaching part of one of the sensor and the injector is formed in a curved shape which bulges upwardly, the heights of upper ends of this part and the sensor or the injector attached to this part can be lowered.

A center axis of an upstream end part of the first passage part may extend linearly in the specific direction. One of the injector and the sensor may be disposed so that, when seen in the specific direction, a tip end of the injector or the sensor is located within an area defined by an inner circumferential surface of the upstream end part of the first passage part and is located below the center of the area in an up-and-down direction.

According to this configuration, more amount of exhaust gas which passed the upstream end part of the first passage part can contact one of the injector and the sensor.

The turbine housing may be arranged so as to be adjacent to the third passage part in an up-and-down direction.

An upstream end part of the first passage part may linearly extend forward from the downstream end of the turbine housing. The center axis of the upstream end part of the first passage part may be extended linearly in a front-and-rear direction.

A center axis of an upstream end part of the first passage part and a center axis of a downstream end part of the turbine housing may be colinear.

A center axis of an upstream end part of the first passage part and a center axis of the third passage part may be substantially parallel.

DETAILED DESCRIPTION OF THE DISCLOSURE

Figure 1:
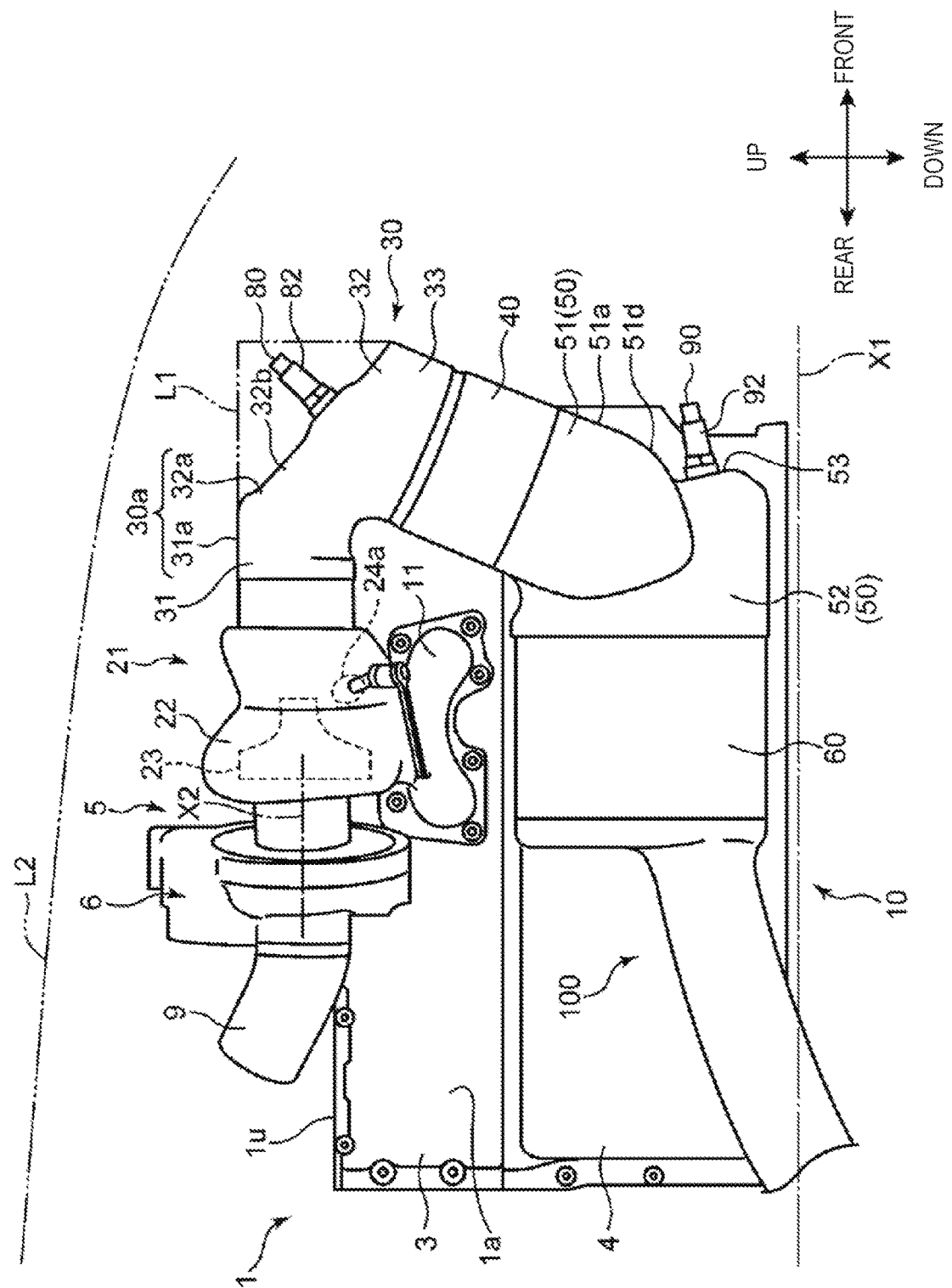
FIG. 1 is a side view schematically illustrating an exhaust system of an engine according to one embodiment of the present disclosure.

Hereinafter, an exhaust system of an engine according to one embodiment of the present disclosure is described with reference to the accompanying drawings. The exhaust system of the engine is mounted on a vehicle. In the following description, a front-and-rear direction of the vehicle is simply referred to as a "front-and-rear direction," and in this front-and-rear direction, a traveling direction of the vehicle when traveling forward is referred to as "front" or "forward" and indicated similarly in the drawings. Moreover, herein, the vertical direction is referred to as an "up-and-down direction," and in this description and the drawings, "up" or "upward" in the vertical direction is described as "up" or "upward," and "down" or "downward" in the vertical direction as "down" or "downward."

Figure 2:
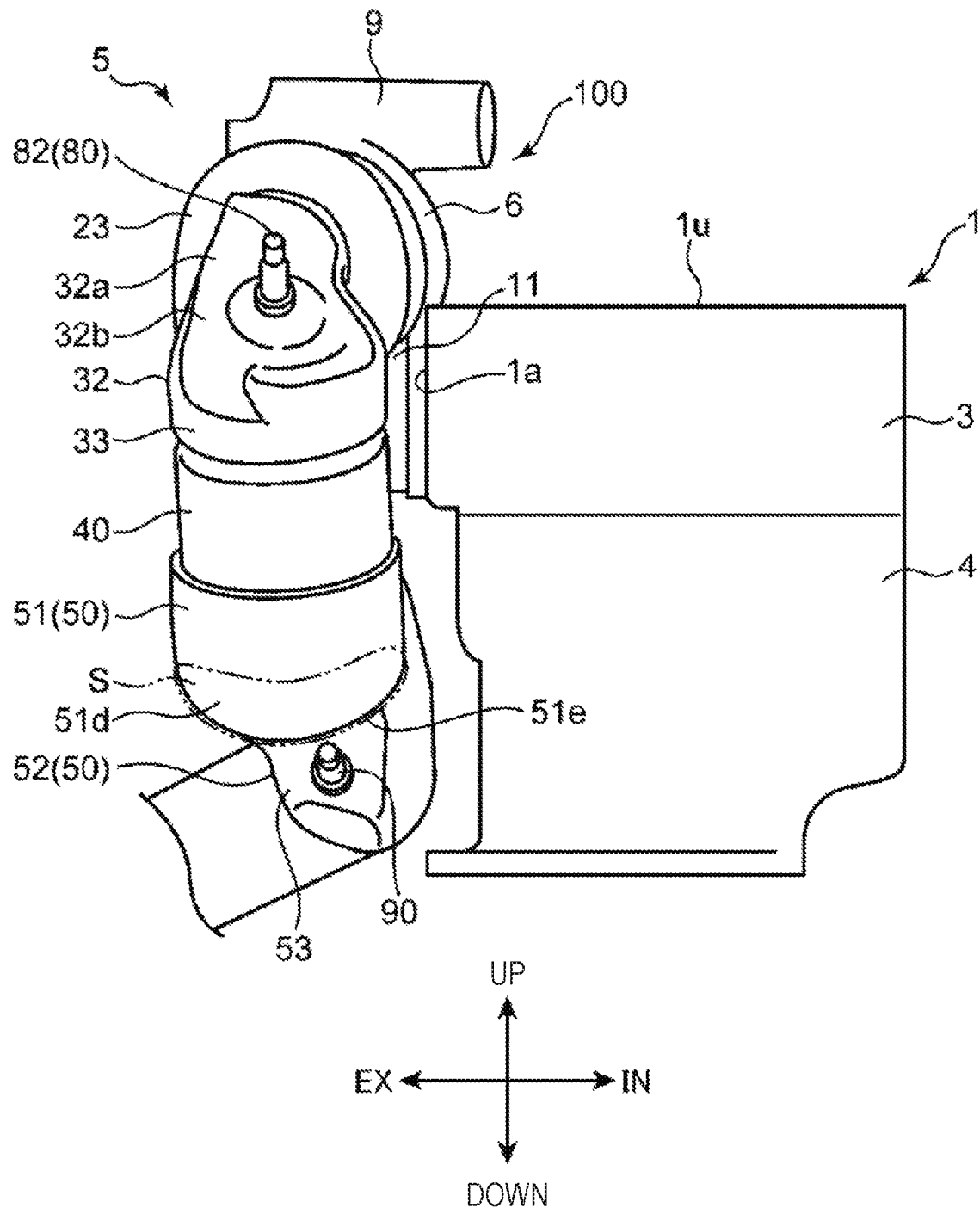
FIG. 2 is a front view schematically illustrating the exhaust system of the engine according to one embodiment of the present disclosure.
Figure 3:
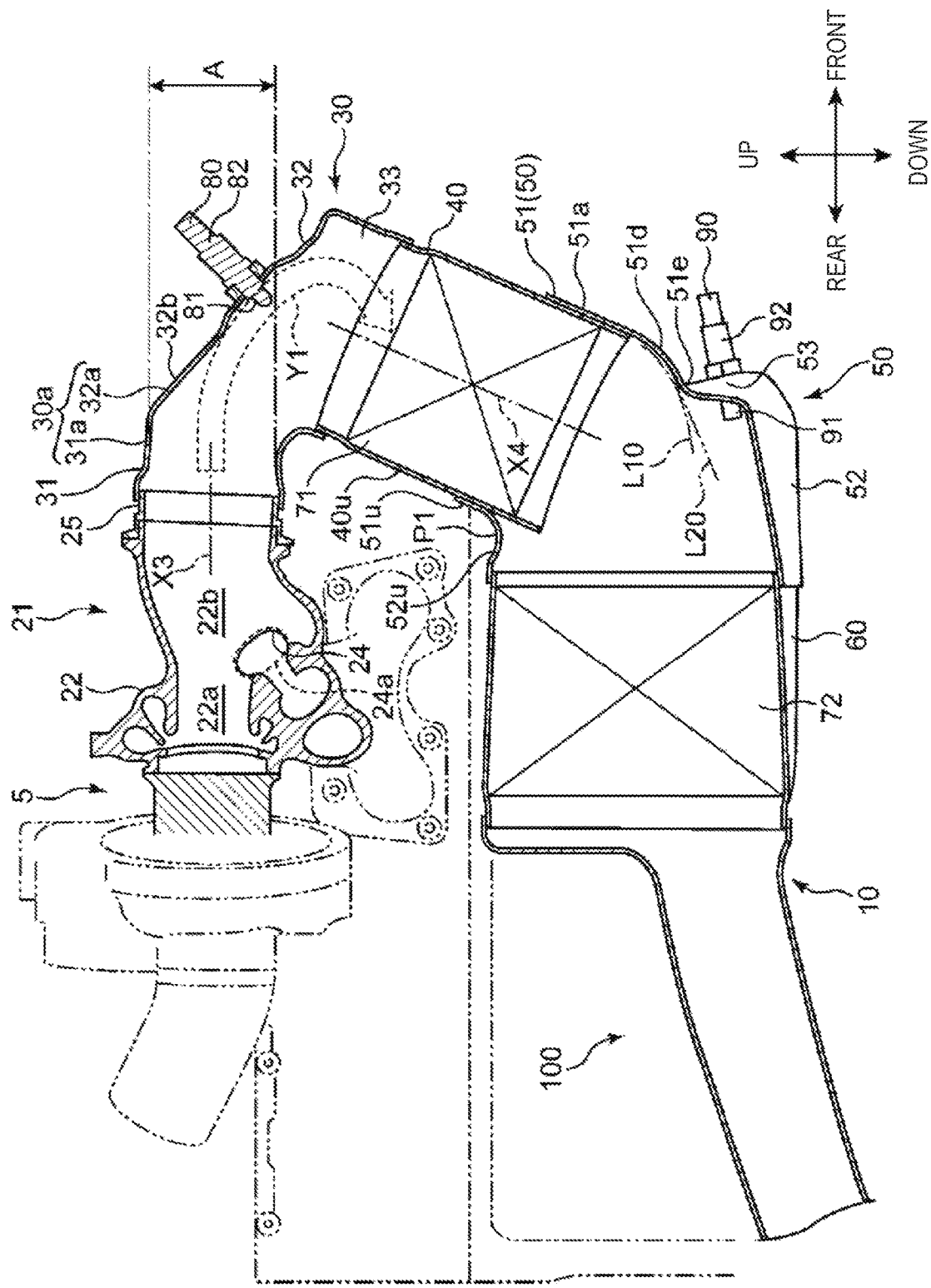
FIG. 3 is a cross-sectional view illustrating an exhaust passage, corresponding to FIG. 1.

FIG. 1 is a side view schematically illustrating a desirable embodiment of an exhaust system 100 of the engine according to the present disclosure. FIG. 2 is a front view schematically illustrating the exhaust system 100. FIG. 3 is a cross-sectional view illustrating an exhaust passage 10, corresponding to FIG. 1.

An engine 1 (hereinafter, referred to as an "engine body 1") illustrated in FIG. 1 is a four-cycle gasoline engine mounted on the vehicle as a power source for traveling. The engine body 1 is an in-series multiple-cylinder engine, and has a plurality of cylinders lined up along a center axis X1 of a crankshaft (not illustrated) which is an output shaft of the engine. In this embodiment, the engine body 1 is accommodated in an engine bay formed in the front side of the vehicle, in such a posture so that the center axis X1 of the crankshaft extends in the front-and-rear direction (i.e., the engine body 1 is a so-called "longitudinal engine"). Thus, in this embodiment, the front-and-rear direction of the vehicle and the longitudinal direction of the crankshaft are aligned with each other, and the front-and-rear direction is an example of a "specific direction" in the present disclosure.

The engine body 1 has a cylinder block 4 where the cylinders are formed therein, and a cylinder head 3 attached to an upper surface of the cylinder block 4. That is, in this embodiment, the engine body 1 is mounted on the vehicle in such a posture that a piston (not illustrated) fitted in each cylinder slides in the up-and-down direction and the cylinder block 4 where the cylinders are formed is located below the cylinder head 3. Note that although in the illustrated example the upper surface of the cylinder block 4 and the lower surface of the cylinder head 3 extend along a horizontal plane and the pistons slide up and down along the vertical line, the engine body 1 may be inclined to the vertical line, the upper surface and the lower surface may be inclined to the horizontal plane, and the sliding direction of the pistons may be inclined to the vertical line.

The exhaust passage 10 where exhaust gas circulates therein is connected to one side surface 1a of the engine body 1 in the width direction (a direction perpendicular to both the front-and-rear direction and the up-and-down direction), and exhaust gas discharged from the engine body 1 is discharged outside of the engine body 1 and the vehicle through this exhaust passage 10. Below, the one side surface 1a of the engine body 1 in the width direction to which the exhaust passage 10 is connected is suitably referred to as the "exhaust side surface 1a." Note that in the drawings, "EX" indicates the side in the width direction of the engine body 1 to which the exhaust passage 10 is connected, and "IN" is the opposite side and indicates the side to which an intake passage 9 for introducing intake air into the engine body 1 is connected.

The exhaust passage 10 is provided with an exhaust manifold 11, a turbine-side part 21 of a turbocharger 5, a first exhaust pipe 30, a second exhaust pipe 40, a third exhaust pipe 50, and a fourth exhaust pipe 60 in this order from upstream. Each of the exhaust pipes 30, 40, 50, and 60 is a pipe member where a passage through which exhaust gas circulates is formed therein. The exhaust passage 10 has a first purifying part 71 and a second purifying part 72 for purifying exhaust gas. The first purifying part 71 is accommodated inside the second exhaust pipe 40. The second purifying part 72 is accommodated inside the fourth exhaust pipe 60. In this embodiment, each of the first purifying part 71 and the second purifying part 72 is a three-way catalyst carried by a monolith carrier.

The exhaust manifold 11 is fixed to the exhaust side surface 1a so as to communicate with exhaust ports. In detail, the exhaust manifold 11 is coupled to a part of the exhaust side surface 1a constituted by the cylinder head 3. Moreover, the exhaust manifold 11 is provided near the center of the exhaust side surface 1a in the front-and-rear direction.

The turbocharger 5 has a turbine wheel 23 which is driven and rotated by exhaust gas, and a compressor 6 which is driven and rotated by the turbine wheel 23 (in detail, a compressor wheel which is driven and rotated by the turbine wheel 23 and a housing which accommodates the compressor wheel). The turbocharger 5 is supported by the exhaust side surface 1a in a posture where the turbine wheel 23, the compressor 6 (compressor wheel), and a rotation center axis X2 of a coupling shaft (not illustrated) which couples the turbine wheel 23 to the compressor 6 extend in the front-and-rear direction, and the turbine wheel 23 is located forward of the compressor 6.

The turbocharger 5 is further provided with a turbine housing 22 which accommodates the turbine wheel 23 and where a passage through which exhaust gas passes is formed therein. The turbine housing 22 has a wheel accommodating part 22a having a scroll part and surrounding the turbine wheel 23, and a discharge passage part 22b which extends forward from the wheel accommodating part 22a and into which exhaust steam after rotating the turbine wheel 23 is introduced. Note that in the example of FIG. 1, the turbocharger 5 is of a twin scroll type, and two scroll parts are formed in the turbine housing 22. The turbine housing 22 is connected to a downstream end of the exhaust manifold 11, and exhaust gas which passed through the exhaust manifold 11 is introduced into the turbine housing 22. The turbine housing 22 is provided with a bypass passage 24 which bypasses the turbine wheel 23 (wheel accommodating part 22*a*) and introduces exhaust gas into the discharge passage part 22*b*. The bypass passage 24 is opened and closed by a waste gate valve 24*a* according to an operating state, etc. of the engine.

The turbocharger 5 is disposed so that a part thereof is located above an upper surface 1*u* of the engine body 1 (i.e., the upper surface of the cylinder head 3). In the illustrated example, the turbocharger 5 is disposed so that the rotation center axis X2 of the turbocharger 5 is located at almost the same height as the upper surface 1*u* of the engine body 1, the upper part of the turbocharger 5 is located above the upper surface 1*u* of the engine body 1, and the lower part of the turbocharger 5 is located below the upper surface 1*u* of the engine body 1.

<First Exhaust Pipe 30>

The first exhaust pipe 30 is connected to a downstream end 25 of the turbine housing 22 (discharge passage part 22*b*), and extends forward from the downstream end 25 of the turbine housing 22. Exhaust gas is introduced into the first exhaust pipe 30 from the turbine housing 22.

An upstream end part 31 of the first exhaust pipe 30 extends linearly forward from the downstream end 25 of the turbine housing 22, and a center axis X3 of the upstream end part 31 extends linearly in the front-and-rear direction. Note that the phrase "extending linearly" as used herein refers not only to the situation of strictly extending "straight," but also includes the situation of extending along a line which is slightly deviated from the "straight" line. In this embodiment, the cross section of the upstream end part 31 presents a circular shape close to a true circle. Moreover, the center axis X3 of the upstream end part 31 is in agreement (i.e., coaxial) with the center axis of a downstream end part of the turbine housing 22 (a part between the downstream end 25 and a location slightly rearward of the downstream end 25).

The first exhaust pipe 30 has such a shape that it inclines forward and downward from the upstream end part 31 and then bends rearward and downward. That is, a part of the first exhaust pipe 30 downstream of the upstream end part 31 is comprised of an intermediate part 32 which inclines forward and downward from the upstream end part 31, and a downstream end part 33 which inclines rearward and downward from a downstream end of the intermediate part 32. The intermediate part 32 is formed so that a length of an upper plane in the flow direction is longer than a lower plane and the downstream end is substantially along a horizontal plane. The downstream end part 33 which extends to the downstream from the intermediate part 32 is constituted so that a length of a forward plane in the flow direction is longer than the rearward plane. Thus, a downstream end of the first exhaust pipe 30 and the downstream end part 33 opens rearward and downward.

With the above structure, an upper surface 30*a* of the first exhaust pipe 30 has such a shape that it is located lower as it goes forward. In detail, the upper surface 30*a* of the first exhaust pipe 30 is comprised of an upper surface 31*a* of the upstream end part 31 which extends linearly in the front-and-rear direction, and an upper surface (slope 32*a*) of the intermediate part 32 which inclines forward and downward from the upper surface 31*a* of the upstream end part 31. That is, the upper surface 30*a* extends linearly forward from the upstream end (rear end) of the first exhaust pipe 30 and then inclines downwardly. Here, the slope 32*a* is an example of an "inclined part" in the present disclosure.

The center part of the slope 32*a* is provided with a flat-surface part 32*b*. The flat-surface part 32*b* is formed in a range of the intermediate part 32 in the flow direction of exhaust gas from a location slightly downstream of the upstream end of the intermediate part 32 to a location slightly upstream of the downstream end of the intermediate part 32. Moreover, the flat-surface part 32*b* is formed in a range of the intermediate part 32 other than both outer parts of the slope 32*a* in the engine width direction.

A first oxygen sensor 80 which detects an oxygen concentration in exhaust gas is attached to the center part of the flat-surface part 32*b*. The first oxygen sensor 80 has a substantially pillar outer shape which extends in a given direction. The first oxygen sensor 80 is provided with a tip-end part 81 which introduces exhaust gas therein and leads outside the exhaust gas after the oxygen concentration is detected.

The first oxygen sensor 80 is attached to the flat-surface part 32*b* so that the tip-end part 81 projects inside the intermediate part 32 and a base-end part 82 extends outside from the intermediate part 32. In this embodiment, the first oxygen sensor 80 is attached to the flat-surface part 32*b* in such a posture that it inclines forward and upward from the flat-surface part 32*b*. Moreover, the first oxygen sensor 80 is attached to such a location that the tip-end part 81 exists within an area A surrounded by an inner circumferential surface of the upstream end part 31, when it is seen in a direction along the center axis X3 of the upstream end part 31 of the first exhaust pipe 30. In this embodiment, the first oxygen sensor 80 is attached to a location below the center of the flat-surface part 32*b* in the up-and-down direction so that the tip-end part 81 is located in a part of the area A below the center in the up-and-down direction. In the illustrated example, the tip-end part 81 of the first oxygen sensor 80 is located near a lower end of the area A. Moreover, the tip-end part 81 of the first oxygen sensor 80 is disposed near the center of the area A in the engine width direction. In this embodiment, the part to which the first oxygen sensor 80 is attached bulges slightly upward to increase the rigidity.

As described above, in this embodiment, the upper part of the turbocharger 5 is disposed at the location above the upper surface 1*u* of the engine body 1, and in connection with this, a part of the first exhaust pipe 30 extending from the turbine housing 22 is disposed at the location above the upper surface 1*u* of the engine body 1. In the illustrated example, the upstream end part 31 of the first exhaust pipe 30 and the part of the intermediate part 32 near the upstream end are disposed at the locations above the upper surface 1*u* of the engine body 1.

<Second Exhaust Pipe 40>

The second exhaust pipe 40 is connected to the downstream end of the first exhaust pipe 30, and exhaust gas is introduced into the second exhaust pipe 40 from the first exhaust pipe 30.

The second exhaust pipe 40 extends along a line which extends the downstream end part 33 of the first exhaust pipe 30 downwardly, and extends rearward and downward from the downstream end of the first exhaust pipe 30 (downstream end part 33). A center axis X4 of the second exhaust pipe 40 extends along a line which inclines rearward and downward, and it inclines so that an upper end is located forward of a lower end. An outer diameter of the first purifying part 71 and an inner diameter of the second exhaust pipe 40 are substantially the same so that the first purifying part 71 is accommodated inside the second exhaust pipe 40 with substantially no clearance therebetween in the radial direction. Moreover, the dimension of the first purifying part 71 in the up-and-down direction (a dimension in the flow direction) is slightly smaller than the dimension of the second exhaust pipe 40 in the up-and-down direction (a dimension in the flow direction) so that the first purifying part 71 occupies substantially the entire internal space of the second exhaust pipe 40.

<Third Exhaust Pipe 50>

The third exhaust pipe 50 is connected to a downstream end of the second exhaust pipe 40, and exhaust gas is introduced into the third exhaust pipe 50 from the second exhaust pipe 40. The third exhaust pipe 50 extends rearward from the downstream end of the second exhaust pipe 40. The third exhaust pipe 50 is comprised of a first connecting part 51 which constitutes an upstream part and into which the second exhaust pipe 40 is inserted, and a second connecting part 52 downstream of the first connecting part 51. A lower end part of the second exhaust pipe 40 is connected to the first connecting part 51 while being inserted into the first connecting part 51 which constitutes an upstream end part of the third exhaust pipe 50.

The first connecting part 51 inclines rearward and downward so that its inner circumferential surface extends along an outer circumferential surface of the second exhaust pipe 40. A front wall 51*a* (a part which constitutes a front surface) of the first connecting part 51 extends to a location below the downstream end of the second exhaust pipe 40. A part 51*d* (a part formed as an area S of FIG. 2) of the front wall 51*a* of the first connecting part 51 below the downstream end of the second exhaust pipe 40 constitutes a lower surface of the first connecting part 51. This part 51*d* extends along a curved surface L10 which bulges downwardly, and therefore it also curves so as to bulge downwardly. The curved part 51*d* is formed entirely in the front wall 51*a* of the first connecting part 51 in the engine width direction. That is, this curved part is formed substantially entirely in the area from one end of the first connecting part 51 to the other end in the engine width direction, which is located at the front side.

The second connecting part 52 extends rearward from a downstream end of the first connecting part 51. The first connecting part 51 extends forward and upward from an upper part of the second connecting part 52, and the third exhaust pipe 50 is provided with a standing wall part 53 which extends downwardly from a lower edge 51*e* of the first connecting part 51 and constitutes a front end surface of the second connecting part 52. The standing wall part 53 is provided substantially entirely in a part of the second connecting part 52 from one end to the other end in the engine width direction.

A sensor which is a second oxygen sensor 90 for detecting the oxygen concentration in exhaust gas and has a similar shape and structure to the first oxygen sensor 80 is attached to a center part of the standing wall part 53. The second oxygen sensor 90 is attached to the standing wall part 53 so that a tip-end part 91 thereof is inserted into the second connecting part 52 and a base-end part 92 thereof extends forward from the standing wall part 53. The second oxygen sensor 90 is attached to the standing wall part 53 in such a posture that it inclines slightly forward and upward from the standing wall part 53. In this embodiment, the standing wall part 53 inclines slightly upward and rearward, and the second oxygen sensor 90 is attached so as to be perpendicular to the standing wall part 53. Moreover, the second oxygen sensor 90 is attached so that the tip-end part 91 which projects inside the second connecting part 52 is located below a tangent L20 of the curved surface L10 which extends in the front-and-rear direction and passes through the lower edge 51*e* of the first connecting part 51. In detail, the second oxygen sensor 90 is disposed so that the tip-end part 91 becomes lower than the tangent L20 of the curved surface L10 at any point on the lower edge 51*e* of the first connecting part 51, in the vertical cross-section perpendicular to the lower edge 51*e*. Moreover, also in the vertical cross-section passing through the center axis of the second oxygen sensor 90, the tip-end part 91 of the second oxygen sensor 90 is disposed at a location lower than the tangent L20 of the curved surface L10 (a tangent passing through the lower edge 51*e*).

As illustrated in FIG. 3, an upper wall 40*u* (a part which constitutes the upper surface) of the second exhaust pipe 40 extends below a lower end part of an upper wall 51*u* (a part which constitutes the upper surface) of the first connecting part 51. That is, the upper wall 40*u* of the second exhaust pipe 40 extends to a location lower than and downstream of a boundary part P1 between the upper wall 51*u* of the first connecting part 51 and an upper wall 52*u* (a part which constitutes the upper surface) of the second connecting part 52.

<Fourth Exhaust Pipe 60>

The fourth exhaust pipe 60 is connected to a downstream end of the third exhaust pipe 50 (the second connecting part 52), and exhaust gas is introduced into the fourth exhaust pipe 60 from the third exhaust pipe 50. The fourth exhaust pipe 60 is connected to the third exhaust pipe 50 so that its upstream end is inserted into the downstream end of the third exhaust pipe 50.

The fourth exhaust pipe 60 extends along a line which extends the downstream end of the third exhaust pipe 50 rearwardly, and extends rearwardly from the downstream end of the third exhaust pipe 50. An outer diameter of the second purifying part 72 and an inner diameter of the fourth exhaust pipe 60 are substantially the same so that the second purifying part 72 is accommodated in the fourth exhaust pipe 60 with substantially no clearance therebetween in the radial direction. Moreover, a dimension of the second purifying part 72 in the front-and-rear direction (a dimension in the flow direction) is slightly smaller than a dimension of the fourth exhaust pipe 60 in the front-and-rear direction (a dimension in the flow direction) so that the second purifying part 72 occupies substantially the entire internal space of the fourth exhaust pipe 60.

The fourth exhaust pipe 60 and the third exhaust pipe 50 which extends forward from the fourth exhaust pipe 60 are disposed below the turbine housing 22. In detail, a downstream part of the third exhaust pipe 50 and substantially the entire part of the fourth exhaust pipe 60 overlap with the turbine housing 22 in the plan view.

Here, the first exhaust pipe 30 is an example of a "first passage part" in the present disclosure. Moreover, the second exhaust pipe 40 is an example of a "second passage part" in the present disclosure. Moreover, the part comprised of the third exhaust pipe 50 and the fourth exhaust pipe 60 is an example of a "third passage part" in the present disclosure. Moreover, the first oxygen sensor 80 is an example of a "sensor" in the present disclosure.

(Operation)

As described above, in this embodiment, the first exhaust pipe 30 extends forward from the turbine housing 22, and the fourth exhaust pipe 60 which accommodates the second purifying part 72 therein and the third exhaust pipe 50 are disposed so as to extend in the front-and-rear direction below the turbine housing 22. The second exhaust pipe 40 which accommodates the first purifying part 71 therein extends upwardly from the front end of the third exhaust pipe 50 and is connected to the first exhaust pipe 30. According to this structure, in this embodiment, the exhaust passage 10 from the turbine housing 22 to the fourth exhaust pipe 60 can be shortened in the front-and-rear direction, compared with a case where the second purifying part 72 and the first exhaust pipe 30 are lined up in the front-and-rear direction.

In addition, in this embodiment, the intermediate part 32 which inclines forward and downward, that is, inclines so that the front part is located lower, is formed in the upper surface 30a of the first exhaust pipe 30, and the first oxygen sensor 80 is attached to this intermediate part 32. Therefore, for example, the height of the upper end of the first oxygen sensor 80 can be lowered, compared with a case where the upper surface 30a of the first exhaust pipe 30 extends linearly in the front-and-rear direction as illustrated by a chain line L1 in FIG. 1.

Particularly, in this embodiment, since the turbocharger 5 projects upwardly above the upper surface 1u of the engine body 1, if the passage is extended linearly forward from the turbine housing 22 of the turbocharger 5 as illustrated by the chain line L1, a projection amount of the first oxygen sensor 80 from the upper surface 1u of the engine body 1 becomes excessive. On the other hand, according to this embodiment the projection amount of the first oxygen sensor 80 from the upper surface 1u of the engine body 1 can be effectively reduced.

Therefore, the first oxygen sensor 80 can be disposed downstream of the turbine housing 22 and upstream of the first purifying part 71, and avoid an interference of the first oxygen sensor 80 with a member disposed above the first oxygen sensor 80. For example, when a hood is provided at a location illustrated by a chain line L2 in FIG. 1, an interference of the hood with the first oxygen sensor 80 is certainly avoidable even when the hood is deformed. Thus, for example, when an object falls on the hood, the hood can be appropriately deformed downwardly to reduce damage to the fallen object.

Further, in this embodiment, the second exhaust pipe 40 is disposed so that its center axis X4 inclines forward and upward. That is, the center axis X4 of the second exhaust pipe 40 inclines so that its upper end is located forward of its lower end. Therefore, as illustrated by an arrow Y1 in FIG. 3, exhaust gas which flows along the slope 32a of the second exhaust pipe 40 can be led to a location closer to the center axis X4 of the second exhaust pipe 40, and the exhaust gas can be introduced into the first purifying part 71 more uniformly.

Moreover, in this embodiment, the flat-surface part 32b is formed in the intermediate part 32, and the first oxygen sensor 80 is attached to the flat-surface part 32b.

Thus, as compared with a case where the attaching part of the first oxygen sensor 80 is formed in a curved shape which bulges upwardly, the heights of the upper end of this part and the first oxygen sensor 80 attached to this part can be lowered.

Moreover, in this embodiment, the center axis X3 of the upstream end part 31 of the first exhaust pipe 30 extends linearly in the front-and-rear direction. Thus, as illustrated by the arrow Y1, a main flow of exhaust gas goes from the upstream end part 31 toward the intermediate part 32 of the first exhaust pipe 30 along the straight line extending in the front-and-rear direction, then becomes a downward flow along the slope 32a. In this embodiment, when seen in the front-and-rear direction, the tip-end part 81 of the first oxygen sensor 80 is disposed in the area below the vertical center of the area A defined by the inner circumferential surface of the upstream end part 31 of the first exhaust pipe 30. Therefore, the tip-end part 81 of the first oxygen sensor 80 can be disposed inside the main flow of the exhaust gas so that the tip-end part 81 of the first oxygen sensor 80 contacts a larger amount of exhaust gas. Thus, the oxygen concentration of the exhaust gas can be detected more accurately.

(Modifications)

Although in the above embodiment the flat-surface part 32b is formed in the slope 32a of the first exhaust pipe 30 and the first oxygen sensor 80 is attached to the flat-surface part 32b, the part to which the first oxygen sensor 80 is attached may be curved, as long as the part inclines so that the front side is located lower. However, as described above, if the flat-surface part 32b is used as the attaching part of the first oxygen sensor 80, the location of the upper end of the first oxygen sensor 80 can be lowered.

Although in the above embodiment the sensor attached to the slope 32a and the flat-surface part 32b is the first oxygen sensor 80 which detects the oxygen concentration in exhaust gas, the parameter to be detected is not limited to the oxygen concentration, as long as the sensor attached to the flat-surface part 32b is a sensor which detects a property of the exhaust gas. For example, a sensor which detects temperature and pressure of the exhaust gas may be attached. Moreover, instead of the sensor, an injector which injects fluid into the exhaust gas may be attached. For example, a urea injector which injects urea into the exhaust gas may be attached. In this case, the first oxygen sensor 80 in FIG. 1 is replaced by the urea injector. Then, in the above embodiment, if the urea injector is attached to the flat-surface part 32b instead of the first oxygen sensor, it is possible to mix the urea with the exhaust gas more homogeneously by disposing the tip-end part 81 of the urea injector within the area below the center of the area A in the up-and-down direction.

Although in the above embodiment the engine is mounted longitudinally inside the engine bay, the engine may be mounted transversely in which the center axis X1 of the crankshaft extends in the vehicle width direction. Note that in this case, the "specific direction" is an example of the vehicle width direction in the present disclosure.

The first purifying part 71 and the second purifying part 72 are not limited to the three-way catalysts, as long as they are capable of purifying exhaust gas. Moreover, one or both of the first purifying part 71 and the second purifying part 72 may be a filter without any catalyst (e.g., a gasoline particulate filter).

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

5 Turbocharger
10 Exhaust Passage
22 Turbine Housing
23 Turbine Wheel
30 First Exhaust Pipe (First Passage Part)
32a Slope (Inclined Part)

32b Flat-surface Part
40 Second Exhaust Pipe (Second Passage Part)
50 Third Exhaust Pipe (Third Passage Part)
60 Fourth Exhaust Pipe (Third Passage Part)
71 First Purifying Part
72 Second Purifying Part
80 First Oxygen Sensor

What is claimed is:

1. An exhaust system provided to an engine having an output shaft extending in a specific direction, comprising:
an exhaust passage through which exhaust gas discharged from the engine circulates;
a turbocharger having a turbine housing, the turbine housing being formed therein with a passage through which exhaust gas passes and configured to accommodate a turbine wheel being driven by exhaust gas; and
a first purifying part and a second purifying part configured to purify exhaust gas, wherein each of the first purifying part and second purifying part is selected from the group comprising catalyst and filter,
wherein the exhaust passage includes:
a first passage part connected to a downstream end of the turbine housing;
a second passage part having the first purifying part therein and connected to a downstream end of the first passage part; and
a third passage part having the second purifying part therein and connected to a downstream end of the second passage part,
wherein the first passage part extends to one side in the specific direction from the turbine housing,
wherein the third passage part extends in the specific direction below the turbine housing,
wherein the second passage part extends upward from one end part of the third passage part in the specific direction,
wherein a center axis of the second passage part inclines so that an upper end thereof is located on one side of a lower end thereof in the specific direction,
wherein the first passage part has in an upper surface thereof an inclined part inclining so that one side of the inclined part is located below another side in the specific direction, and
wherein an oxygen sensor configured to detect a property of exhaust gas is attached to the inclined part such that a height position of an upper end of the oxygen sensor is located below the upper surface of an upstream end part of the first passage part in an up-and-down direction.

2. The exhaust system of claim 1, wherein the inclined part is provided with a flat-surface part, and the oxygen sensor is attached to the flat-surface part.

3. The exhaust system of claim 2,
wherein a center axis of the upstream end part of the first passage part extends linearly in the specific direction, and
wherein the oxygen sensor is disposed so that, when seen in the specific direction, a tip end of the oxygen sensor is located within an area defined by an inner circumferential surface of the upstream end part of the first passage part and is located below the center of the area in an up-and-down direction.

4. The exhaust system of claim 1,
wherein a center axis of the upstream end part of the first passage part extends linearly in the specific direction, and
wherein the oxygen sensor is disposed so that, when seen in the specific direction, a tip end of the oxygen sensor is located within an area defined by an inner circumferential surface of the upstream end part of the first passage part and is located below the center of the area in an up-and-down direction.

5. The exhaust system of claim 1, wherein the turbine housing is arranged so as to be adjacent to the third passage part in an up-and-down direction.

6. The exhaust system of claim 1,
wherein the upstream end part of the first passage part linearly extends forward from the downstream end of the turbine housing, and
wherein a center axis of the upstream end part of the first passage part is extended linearly in a front-and-rear direction.

7. The exhaust system of claim 1, wherein a center axis of the upstream end part of the first passage part and a center axis of a downstream end part of the turbine housing is colinear.

8. The exhaust system of claim 1, wherein a center axis of the upstream end part of the first passage part and a center axis of the third passage part are substantially parallel.

9. The exhaust system of claim 6, wherein the center axis of the upstream end part of the first passage part and a center axis of a downstream end part of the turbine housing are colinear.

10. The exhaust system of claim 6, wherein the center axis of the upstream end part of the first passage part and a center axis of the third passage part are substantially parallel.

11. The exhaust system of claim 9, wherein the center axis of the upstream end part of the first passage part and a center axis of the third passage part are substantially parallel.

12. The exhaust system of claim 1, wherein a portion of the first passage part that is downstream of the upstream end part comprises an intermediate part that inclines forward and downward from the upstream end part and a downstream end part that inclines rearward and downward from a downstream end of the intermediate part.

13. The exhaust system of claim 12, wherein the intermediate part is formed so that a length of an upper plane in a flow direction is longer than a lower plane and the downstream end is substantially along a horizontal plane, and the downstream end part is formed so that a length of a forward plane in the flow direction is longer than a rearward plane.

* * * * *